United States Patent
Abney, III et al.

[11] Patent Number: 5,904,057
[45] Date of Patent: *May 18, 1999

[54] LOCKABLE FUEL CAP

[75] Inventors: William Abney, III, Richmond; Jeffery Griffin, Connersville, both of Ind.

[73] Assignee: Stant Manufacturing Inc., Connersville, Ind.

[21] Appl. No.: 09/063,596

[22] Filed: Apr. 21, 1998

Related U.S. Application Data

[60] Provisional application No. 60/044,501, Apr. 21, 1997.

[51] Int. Cl.$^6$ .................................................. B65D 55/14
[52] U.S. Cl. ................................ 70/167; 70/165; 70/171; 70/163; 220/210; 220/203.26; 220/DIG. 33
[58] Field of Search ............................. 70/163, 165, 166, 70/167, 168, 169, 170, 171, 172, 173; 220/210, 212.5, 203.24, 203.25, 203.26, 220, 303, 304, DIG. 33

[56] References Cited

U.S. PATENT DOCUMENTS

| | | |
|---|---|---|
| 2,681,559 | 6/1954 | Friend . |
| 2,816,433 | 12/1957 | Friend . |
| 3,373,894 | 3/1968 | Johnson . |
| 3,998,078 | 12/1976 | Detwiler ..................................... 70/171 |
| 4,107,960 | 8/1978 | Neiman ...................................... 70/165 |
| 4,107,961 | 8/1978 | Evans ......................................... 70/165 |
| 4,132,091 | 1/1979 | Aro et al. .................................. 70/165 |
| 4,231,240 | 11/1980 | Fujita et al. ............................... 70/165 |
| 4,280,347 | 7/1981 | Evans ....................................... 220/210 |
| 4,299,102 | 11/1981 | Aro ........................................... 70/165 |
| 4,342,208 | 8/1982 | Evans ........................................ 70/165 |
| 4,453,388 | 6/1984 | Baker et al. ............................... 70/165 |
| 4,676,390 | 6/1987 | Harris .............................. 220/DIG. 33 |
| 4,765,505 | 8/1988 | Harris .............................. 220/DIG. 33 |
| 4,984,698 | 1/1991 | Stuckey .................................. 220/210 |
| 5,183,173 | 2/1993 | Heckman ................................ 220/210 |
| 5,381,919 | 1/1995 | Griffin et al. ................... 220/DIG. 33 |
| 5,449,086 | 9/1995 | Harris ..................................... 220/303 |
| 5,520,300 | 5/1996 | Griffin ............................ 220/DIG. 33 |
| 5,540,347 | 7/1996 | Griffin .................................... 220/304 |
| 5,638,975 | 6/1997 | Harris ..................................... 220/303 |
| 5,791,507 | 8/1998 | Harris et al. ..................... 220/DIG. 33 |
| 5,794,806 | 8/1998 | Harris et al. ....................... 220/203.24 |

*Primary Examiner*—Steven Meyers
*Assistant Examiner*—Stephen Grady
*Attorney, Agent, or Firm*—Barnes & Thornburg

[57] ABSTRACT

A lockable fuel cap is provided including a closure member having a drive tooth and a removal hub. The hub includes a drive lug and moves between a lock position in which the drive lug is spaced-apart from the drive tooth and a release position in which the drive lug engages the drive tooth. An outer shell is also provided and includes an interior wall defining a guiding slot to receive the drive lug and guide movement of the removal hub between the two positions. The shell is drivingly coupled to the hub so that the member remains stationary upon rotation of the shell when the drive lug is in the lock position. The member rotates upon rotation of the shell when the drive lug is in the release position.

47 Claims, 8 Drawing Sheets

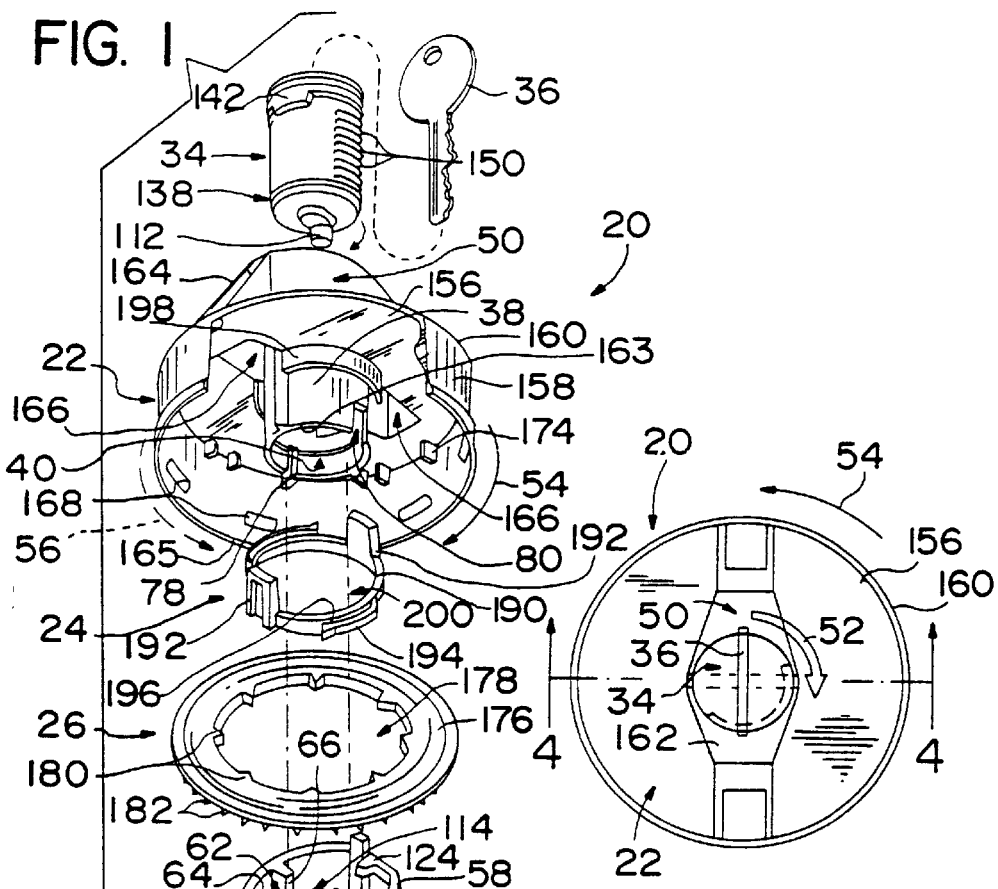
FIG. 1
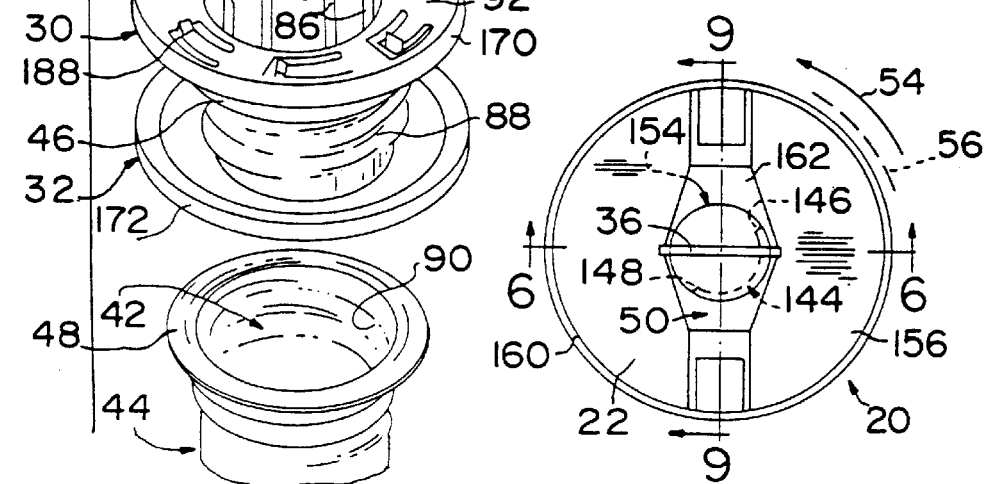
FIG. 2
FIG. 3

LOCKABLE FUEL CAP

This application is a continuation of provisional application Ser. No. 60/044,501 filed Apr. 21, 1997.

BACKGROUND AND SUMMARY OF THE INVENTION

The present invention relates to a fuel cap that can be inserted into an open end of a fuel tank filler neck, and particularly, to a fuel cap that can be locked after insertion into the filler neck to prevent removal of the fuel cap from the filler neck. More particularly, the present invention relates to a lockable fuel cap having a key-operated lock cylinder that unlocks the fuel cap relative to the filler neck when a key is inserted into the lock cylinder and turned.

Fuel caps that couple to open ends of vehicle filler necks to close the open end of the filler neck are known. See for example U.S. Pat. Nos. 4,280,347 to Evans and 5,520,300 to Griffin. Some fuel caps have key-operated locking mechanisms that are operable to lock the fuel cap in the filler neck. During refueling of vehicles having key-operated locking mechanisms, a key is used to unlock the fuel cap allowing the fuel cap to be removed from the filler neck.

According to the present invention, a lockable fuel cap is provided for mounting in an open end of a vehicle filler neck. The fuel cap includes a closure member adapted to mate with the open end of the vehicle filler neck. The closure member is formed to include an interior region and a drive tooth positioned to lie in the interior region. The lockable fuel cap also includes a removal hub positioned to lie within the interior region of the closure member. The removal hub is formed to include a drive lug and is movable between a locking position in which the drive lug is spaced apart from the drive tooth of the closure member and a releasing position in which the drive lug engages the drive tooth. The lockable fuel cap further includes an outer shell having an interior wall. The interior wall of the outer shell defines a guide slot for receiving the drive lug of the removal hub in order to guide the movement of the removal hub between the locking and releasing positions. The outer shell is also rotatable relative to the closure member while being drivingly coupled to the removal hub so that the closure member remains stationary upon rotation of the outer shell in a cap-removal direction when the drive lug of the removal hub is in the locking position. Alternately, the closure member rotates in the cap-removal direction upon rotation of the outer shell in the cap-removal direction when the drive lug is in the releasing position.

In preferred embodiments, the removal hub includes an arcuate front wall and an arcuate rear wall. The arcuate front and rear walls are spaced apart such that an inner region is defined therebetween. The guide slot of the removal hub is formed in the front wall. The fuel cap of the present invention further comprises a lock cylinder rotatable relative to the outer shell. The lock cylinder includes a throw member being positioned to lie within the inner region of the removal hub. The removal hub additionally includes a drive post such that during rotation of the lock cylinder to move the removal hub from the locking position to the releasing position, the throw member engages the drive post.

Further, the lockable fuel cap includes an installation hub drivingly coupled to the outer shell to transmit rotation of the outer shell in a cap-installation direction to the closure member. The installation hub includes a ring and a driven portion extending upwardly from the ring and into a cavity formed within the outer shell. The installation hub further includes flexible fingers appended to the ring and coupled to a torque-override ring that has radial drive teeth. The torque override ring is coupled to the closure member so that continued rotation of the outer shell in a cap installation direction after the closure member is adequately sealed within the filler neck, results in continued rotation of the installation hub and the torque-override ring without continued rotation of the closure member.

Additional features and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is an exploded perspective view of a lockable fuel cap according to the present invention showing (from the top of the page to the bottom of the page) a lock cylinder and key, an outer shell having a raised operating handle and a portion broken away to expose a cylindrical interior wall of the outer shell, an installation hub, a torque-override ring, a removal hub, an externally threaded closure member, and a retainer ring, and also showing a filler neck that receives the fuel cap positioned beneath the fuel cap;

FIG. 2 is a top plan view of the fuel cap of FIG. 1 (after assembly) showing the key inserted into the lock cylinder before it is turned ninety degrees (90°) in the direction of the double arrow from a first position (shown in solid) in which the fuel cap is locked to a second position (shown in phantom) in which the fuel cap is unlocked so that the fuel cap can be removed from the filler neck;

FIG. 3 is top plan view of the fuel cap of FIG. 2 after the key has been turned ninety degrees(90°) to the second position;

FIG. 11 is a view similar to FIG. 7 showing the removal hub at a position in which a ramp surface of the lug of the removal hub is engaging a ramp surface of one of the plurality of teeth of the closure member;

FIG. 12 is a view similar to FIG. 11 showing the removal hub shifting relative to the cylindrical interior wall of the outer shell in the direction of the single arrow in response to further rotation of the removal hub in the cap-insertion direction;

FIG. 13 is an enlarged sectional view of a portion of the cylindrical interior wall of the outer shell and one of the flexible fingers of the removal hub showing the flexible finger moving from a transition position (in solid) in which an apex of the flexible finger engages an apex of the snap rib, back to the first position (in phantom) in which the flexible finger engages the rear inclined edge of the snap rib; and FIG. 14 is a view similar to FIG. 12 showing the removal hub moved to a position in which the lug of the removal hub is separated away from the teeth of the closure member so that the closure member does not rotate in response to rotation of the removal hub in the cap-removal direction.

DETAILED DESCRIPTION OF THE DRAWINGS

Figure 4:
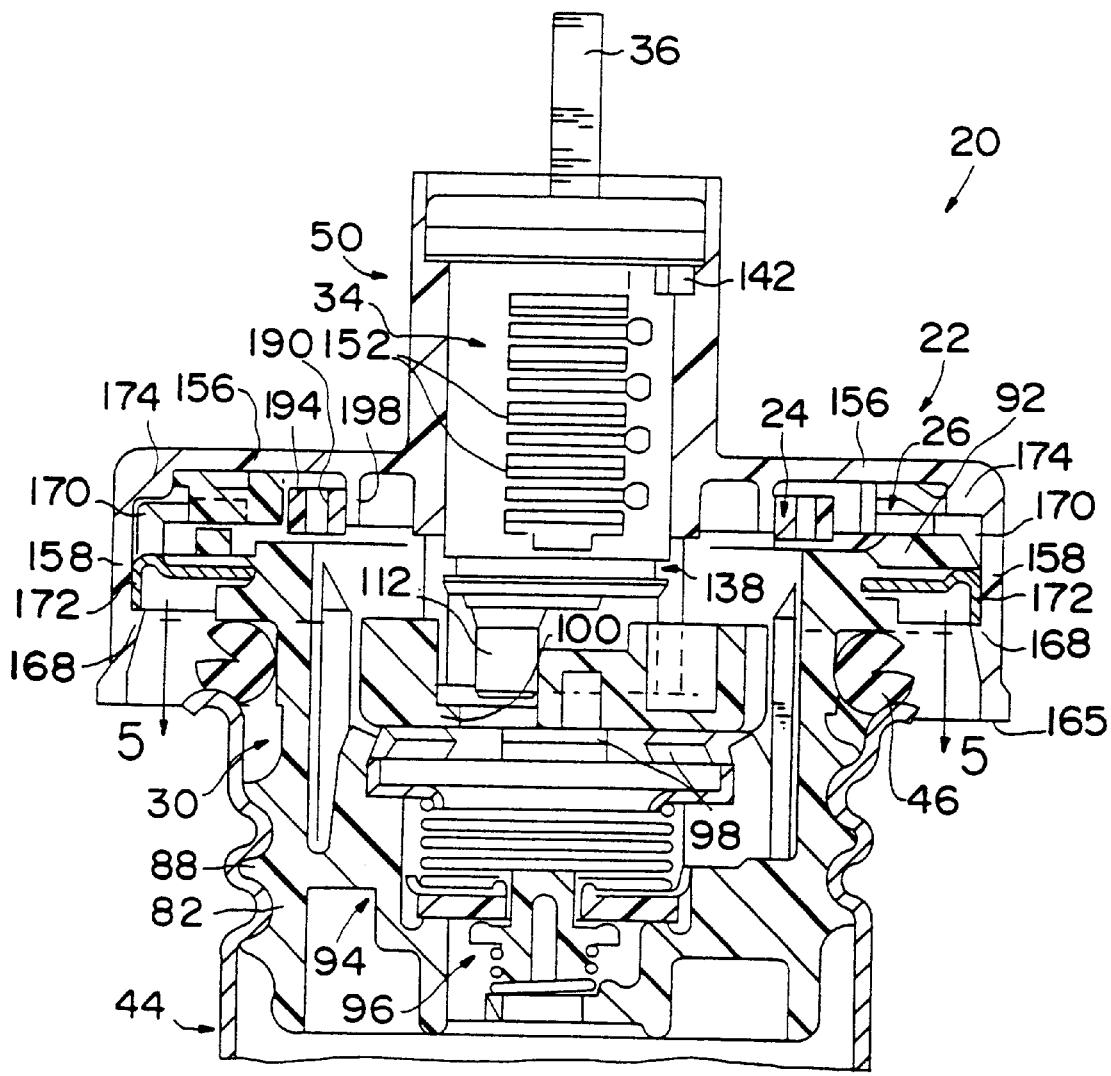
FIG. 4 is a sectional view of the fuel cap and filler neck, taken along line 4—4 of FIG. 2, showing the orientation of the key, the lock cylinder, and the removal hub when the fuel cap is he lock cylinder having a downwardly depending throw member engaging the removal hub.

An exploded view of a lockable fuel cap 20 in accordance with the present invention is shown in FIG. 1. Fuel cap 20 includes an outer shell 22, an installation hub 24, a torque-override ring 26, a removal hub 28, an externally threaded closure member 30, and a retainer ring 32. Fuel cap 20 also includes a lock cylinder 34 that is operated by a key 36. Outer shell 22 is formed to include a cylindrical interior wall 38 having a bore 40 into which lock cylinder 34 is inserted. Fuel cap 20 can be threaded into an open end 42 of a fuel tank filler neck 44 so that an O-ring 46 mounted on closure member 30 seals against a lip 48 of filler neck 44 to close off open end 42 of filler neck 44.

Outer shell 22 of fuel cap 20 includes a raised operating handle 50 that extends diametrically across outer shell 22 as shown in FIGS. 1–3. Operating handle 50 can be grasped to rotate fuel cap 20 relative to filler neck 44 during installation of fuel cap 20 into filler neck 44 and during removal of fuel cap 20 from filler neck 44.

Fuel cap 20 can be locked to prevent removal of fuel cap 20 from filler neck 44 when installed therein. Fuel cap 20 can also be unlocked to allow removal of fuel cap 20 from filler neck 44. When fuel cap 20 is locked, outer shell 22 can be rotated in a counterclockwise cap-removal direction, indicated by arrow 54 shown in FIGS. 1 and 2, but closure member 30 will remain stationary relative to filler neck 44 so that fuel cap 20 remains installed in filler neck 44. When fuel cap 20 is unlocked, rotation of outer shell 22 in cap-removal direction 54 results in rotation of closure member 30 in cap-removal direction 54 relative to filler neck 44 so that fuel cap 20 can be removed from filler neck 44.

Key 36 can be inserted into lock cylinder 34 and turned in a direction indicated by arrow 52, shown in FIG. 2, from a first position, shown in FIG. 2 (in solid), to a second position, shown in FIGS. 2 and 3 (in phantom in FIG. 2). When key 36 is in the second position, fuel cap 20 is unlocked and can be removed from filler neck 44. During the removal of fuel cap 20 from filler neck 44, key 36 can be left in lock cylinder 34 in the second position, shown in FIG. 3, or key 36 can be rotated back to the first position, shown in FIG. 2, and either left in lock cylinder 34 in the first position or removed from lock cylinder 34 altogether. Thus, once key 36 has been rotated in direction 52 from the first position to the second position to unlock fuel cap 20, fuel cap 20 remains unlocked during the removal of fuel cap 20 from filler neck 44 regardless of the position of key 36 and regardless of whether key 36 remains inserted in lock cylinder 34.

After fuel cap 20 has been removed from filler neck 44, thereby allowing the vehicle (not shown) associated with filler neck 44 to be refueled, fuel cap 20 can be installed back into filler neck 44 by rotation of outer shell 22 in a clockwise cap-installing direction, as indicated by arrow 56 shown in FIGS. 1 and 3 (in phantom). Rotation of outer shell 22 in cap-installing direction 56 results in rotation of closure member 30 in cap-installing direction 56 relative to filler neck 44 until O-ring 46 seals against lip 48 of filler neck 44. When O-ring 46 seals against lip 48, closure member 30 can no longer rotate in cap-installing direction 56 relative to filler neck 44.

A torque override connection between outer shell 22 and closure member 30 allows outer shell 22 to be further rotated in cap-installing direction 56 after O-ring 46 seals against lip 48 of filler neck 44. During installation of fuel cap 20 back into filler neck 44, after fuel cap 20 has been unlocked and removed from filler neck 44, fuel cap 20 remains unlocked while outer shell 22 and closure member 30 are rotated in cap-installing direction 56. After O-ring 46 seals against lip 48 of filler neck 44, fuel cap 20 automatically locks when outer shell 22 is rotated by a slight amount in cap-installing direction 56 relative to closure member 30.

The various components of fuel cap 20 cooperate to establish and disable separate driving connections for cap removal and installation. Two separate driving connections permit installation and removal of fuel cap 20 from filler neck 44. In a first cap-installing driving connection, outer shell 22 is drivingly coupled to installation hub 24, installation hub 24 is drivingly coupled to torque-override ring 26, and torque-override ring 26 is drivingly coupled to closure member 30. Rotation of outer shell 22 in cap-installing direction 56 is transmitted to closure member 30 through installation hub 24 and torque-override ring 26.

In a second cap-removing driving connection, which is only established when fuel cap 20 is unlocked, outer shell 22 is drivingly coupled to removal hub 28 and removal hub 28 is drivingly coupled to closure member 30 so that rotation of outer shell 22 in cap-removal direction 54 is transmitted to closure member 30 through removal hub 28. When fuel cap 20 is locked, outer shell 22 is still drivingly connected to removal hub 28 but removal hub 28 is no longer drivingly coupled to closure member 30. Thus, whether removal hub 28 is drivingly coupled to closure member 30 determines whether fuel cap 20 is locked or unlocked.

Removal hub 28 includes an arcuate front wall 58 and an arcuate rear wall 60 spaced apart from front wall 58 to define an interior region 62 therebetween as shown in FIG. 1. Rear wall 60 includes an inner surface 64 and a first guide lug 66 extends forwardly away from inner surface 64 into interior region 62. Front wall 58 includes an inner surface 68 and an outer surface 70. A second guide lug 72 extends rearwardly away from inner surface 68 toward first guide lug 66 and a drive lug 74 extends forwardly away from outer surface 70. A drive post 76 of removal hub 28 is positioned to lie in interior region 62 between front and rear walls 58, 60. Second guide lug 72 connects front wall 58 to drive post 76.

Cylindrical interior wall 38 of outer shell 22 is formed to include a first guide slot 78 that receives first guide lug 66 and a second guide slot 80 that receives second guide lug 72. When first and second guide lugs 66, 72 are received in respective first and second guide slots 78, 80, an upper portion of drive post 76 of removal hub 28 is received in bore 40 of cylindrical interior wall 38 and a lower portion of cylindrical interior wall 38 is received in interior region 62 of removal hub 28. In addition, cylindrical interior wall 38 engages first and second guide lugs 66, 72 to establish the driving connection between outer shell 22 and removal hub 28 so that rotation of outer shell 22 results in rotation of removal hub 28.

Closure member 30 includes a cylindrical side wall 82 defining an interior region 84 that receives removal hub 28. Closure member 30 also includes a plurality of axially-extending drive teeth 86 extending away from side wall 82 into interior region 84. In addition, closure member 30 includes an external thread 88 appended to side wall 82. Thread 88 is adapted to be received by a spiral groove 90 formed in filler neck 44 adjacent to lip 48 to threadably couple fuel cap 20 to filler neck 44. Closure member 30 further includes an annular flange 92 extending radially away from side wall 82 in perpendicular relation therewith.

Figure 6:
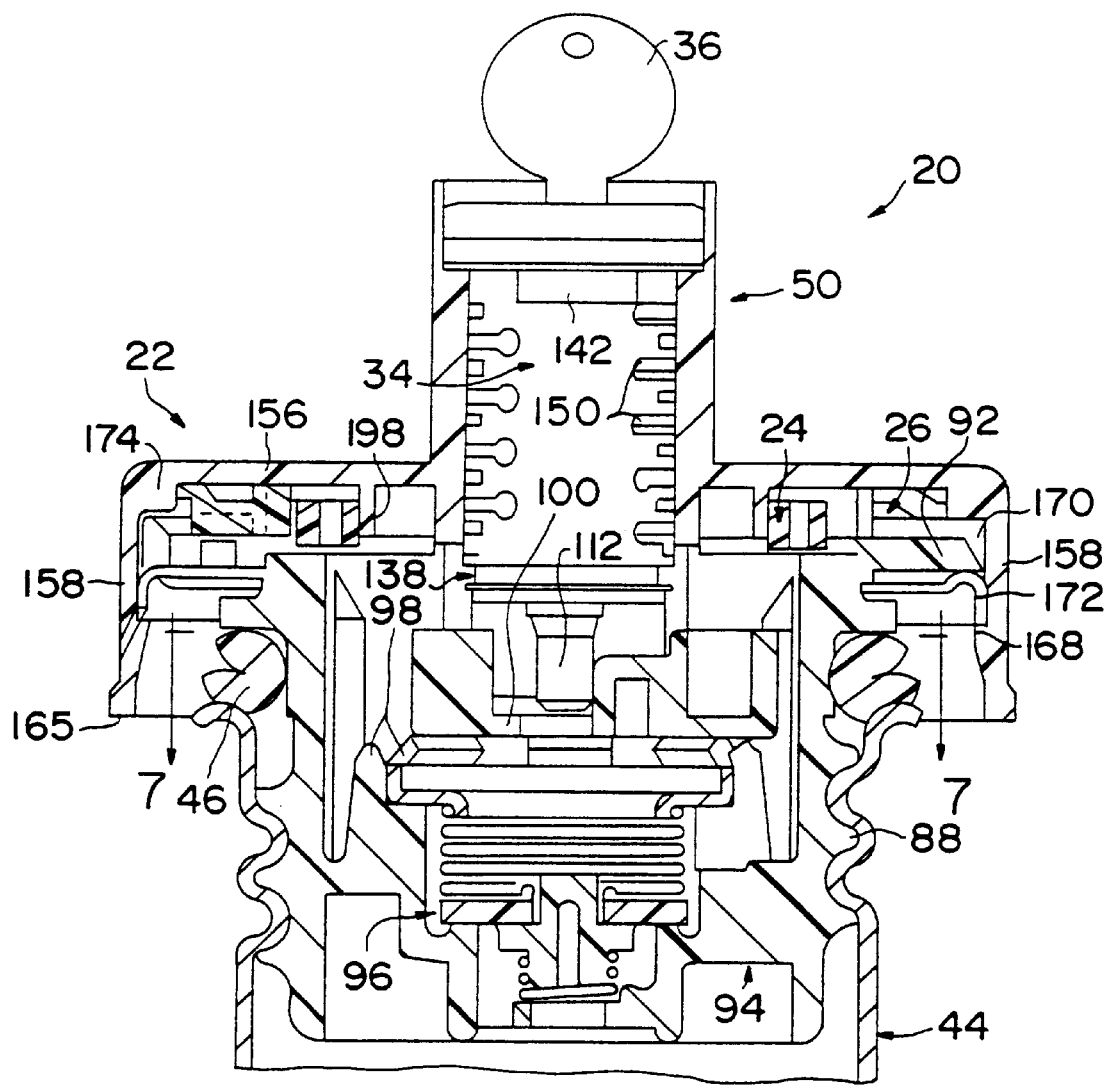
FIG. 6 is a sectional view of the fuel cap and filler neck, taken along line 6—6 of FIG. 3, showing the orientation of the key, the lock cylinder, and the removal hub after the key has been turned from the first position to the second position so that the throw member of the lock cylinder has been moved to shift the removal hub from the position shown in FIG. 4 to the position shown in FIG. 6.
Figure 9:
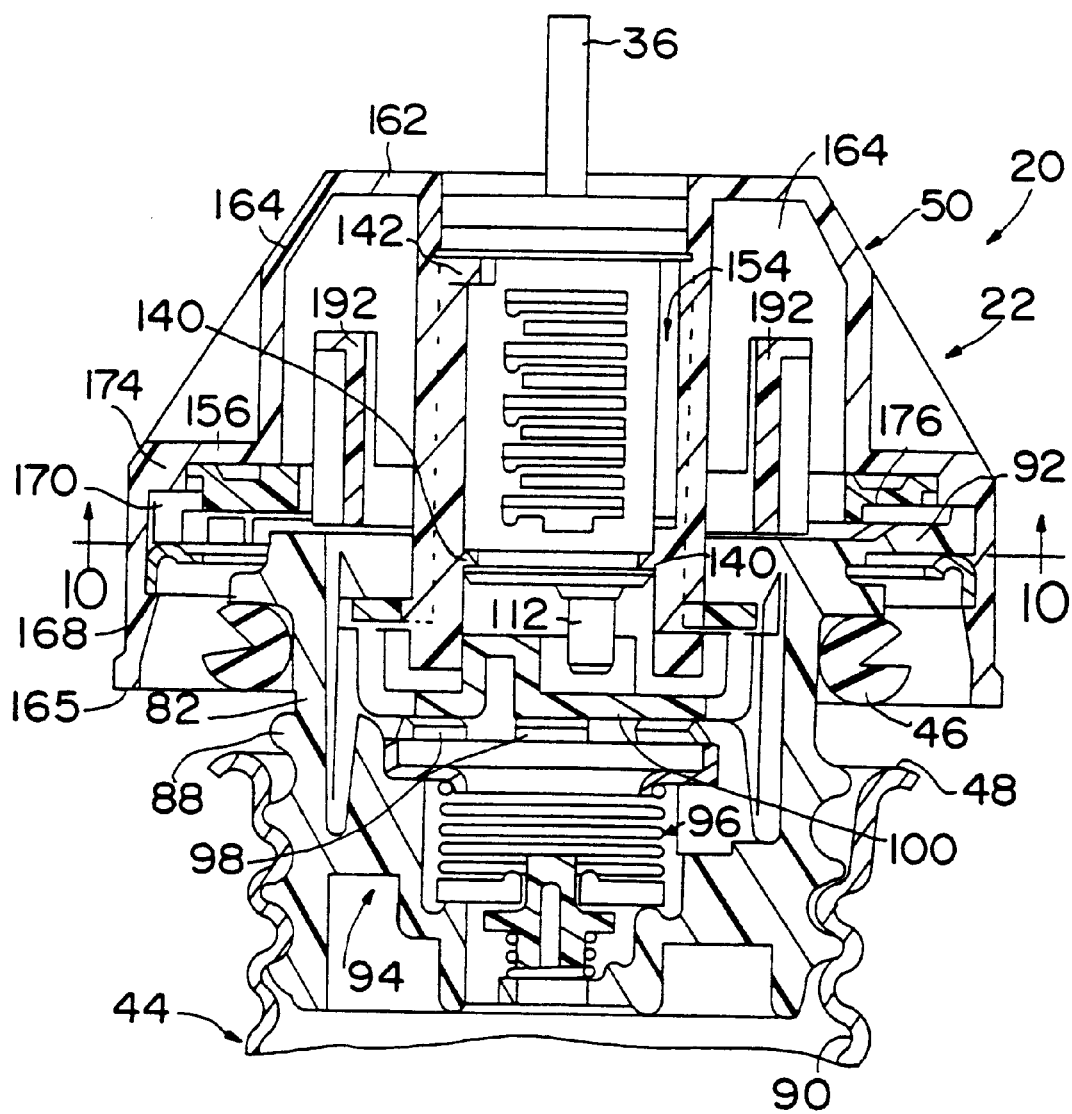
FIG. 9 is a sectional view of the fuel cap and filler neck, taken along line 9—9 of FIG. 3, showing the orientation of the fuel cap relative to the filler neck after the cap has been rotated from the position shown in FIG. 6 one and a quarter turns in the counterclockwise cap-removal direction.

Closure member 30 includes a valve housing structure 94 appended to side wall 82 beneath axially-extending drive teeth 86 of closure member 30 as shown in FIGS. 4, 6, and 9. Fuel cap 20 includes a vent valve assembly 96 carried by valve housing structure 94 within interior region 84 of closure member 30. Vent valve assembly 96 operates in a conventional manner to allow excess pressure to vent out of filler neck 44 and to allow ambient air to vent into filler neck 44. The operation of vent valve assembly 96 is unrelated to the locking and unlocking of fuel cap 20. Valve housing structure 94 includes a plurality of tabs 98 that engage vent valve assembly 96 to secure vent valve assembly 96 within valve housing structure 94.

Figure 5:
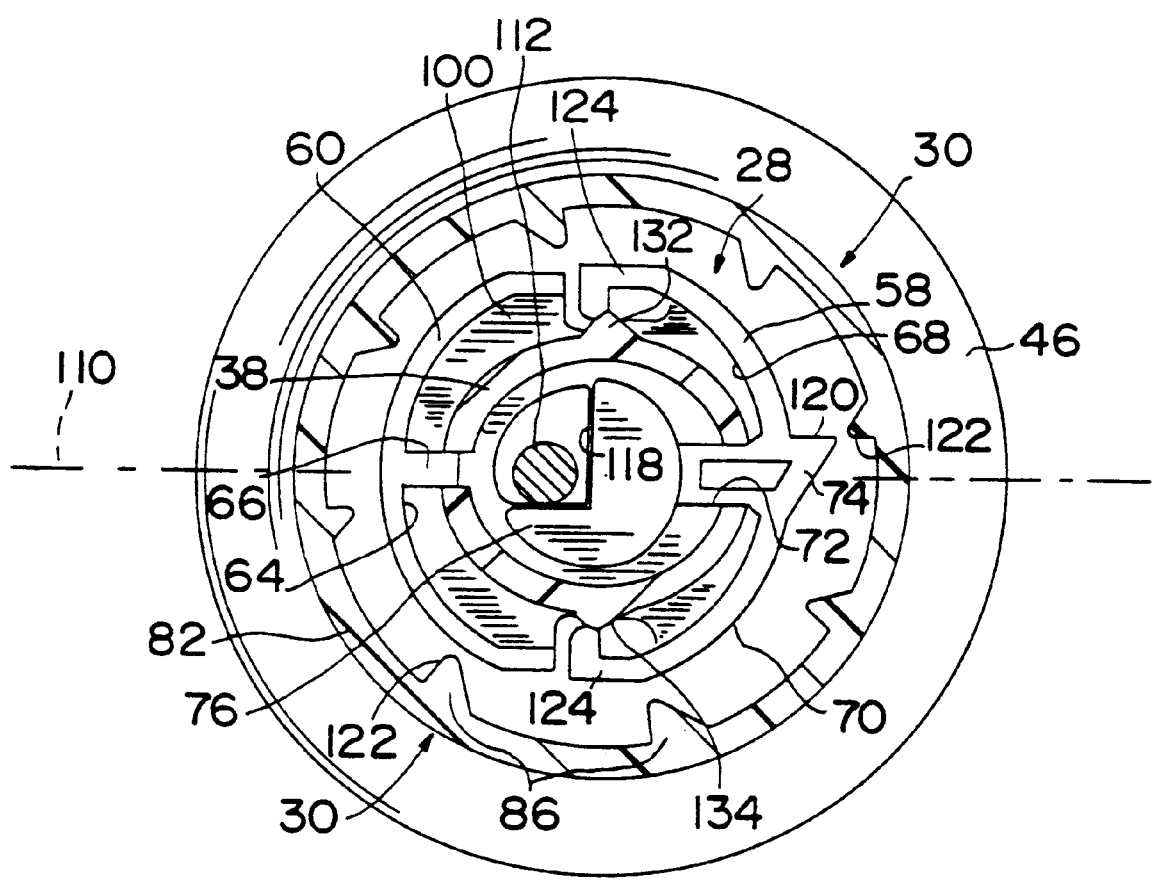
FIG. 5 is a sectional view of the fuel cap, taken along line 5—5 of FIG. 4, showing a cylindrical side wall of the closure member defining an interior region in the closure member, a plurality of drive teeth of the closure member appended to the cylindrical side wall and arranged to extend into the interior region, and the removal hub positioned to lie in the interior region of the closure member, the removal hub including a radially outwardly-extending lug that is closely adjacent to, but spaced apart from, one of the drive teeth.
Figure 7:
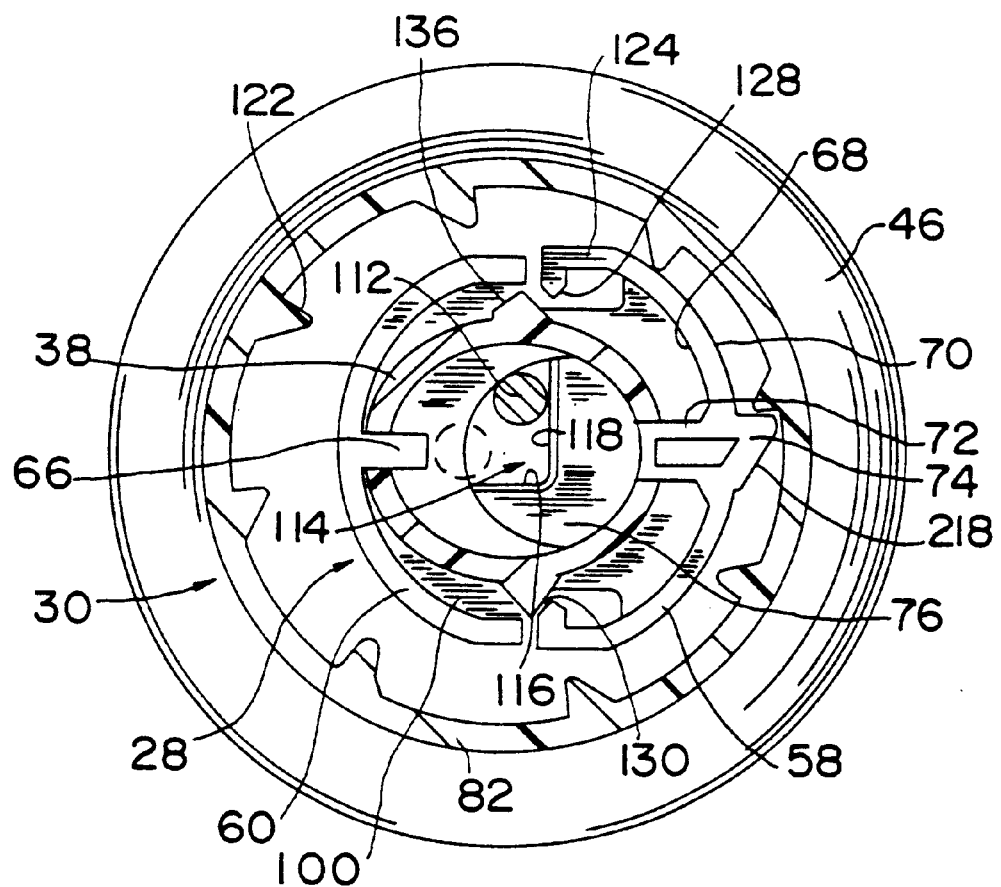
FIG. 7. is a sectional view taken along line 7—7 of FIG. 6, showing the lug of the removal hub engaging one of the teeth appended to the closure member so that rotation of the removal hub in a counterclockwise cap-removal direction will result in rotation of the closure member in the counterclockwise cap-removal direction.

Removal hub 28 is supported within interior region 84 of closure member 30 by tabs 98 of valve housing structure 94. Tabs 98 engage a bottom plate 100 of removal hub 28 as shown in FIGS. 4, 6, and 9. Removal hub 28 can be shifted within interior region 84 of closure member 30 between a rearward locking position in which drive lug 74 is spaced apart from drive teeth 86, as shown in FIGS. 4 and 5, and a forward unlocking position in which drive lug 74 can engage one of drive teeth 86, as shown in FIGS. 6 and 7. First and second guide slots 78, 80 formed in cylindrical interior wall 38 cooperate with first and second guide lugs 66, 72 of removal hub to define a diametral shift path 110, shown in FIG. 5 (dotted line), along which removal hub 28 moves when shifted between the locking and unlocking positions relative to closure member 30.

As previously described, lock cylinder 34 is inserted into bore 40 formed in cylindrical interior wall 38 of outer shell 22. Lock cylinder 34 includes a throw member 112 and drive post 76 is formed to include a cut-out 114 that receives throw member 112. Drive post 76 includes a first surface 116 and a drive surface 118 that cooperates with first surface 116 to define cut-out 114. When key 36 is inserted into lock cylinder 34 and turned in direction 52 from the locking position to the unlocking position, throw member 112 engages drive surface 118 to push removal hub 28 along shift path 110 from the locking position, shown in FIGS. 4 and 5, to the unlocking position, shown in FIGS. 6 and 7.

Drive lug 74 of removal hub 28 includes a drive surface 120 and each axially-extending drive tooth 86 includes a drive surface 122 as shown in FIG. 5. Rotation of outer shell 22 in cap-removal direction 54, after removal hub 28 has been shifted to the unlocking position, causes drive surface 120 of drive lug 74 to engage drive surface 122 of one of drive teeth 86. Further rotation of outer shell 22 in cap-removal direction 54, after drive surface 120 engages one of drive surfaces 122, causes closure member 30 to rotate in cap-removal direction 54 relative to filler neck 44. As outer shell 22 and closure member 30 are rotated in cap-removal direction 54, O-ring 46 separates away from lip 48 of filler neck 44, as shown, for example, in FIG. 9. After sufficient rotation of outer shell 22 and closure member 30 in cap-removal direction 54, fuel cap 20 can be completely removed from filler neck 44.

Removal hub 28 includes a pair of spaced-apart flexible fingers 124 as shown in FIG. 1. Each finger 124 is L-shaped and includes a first portion appended to front wall 58 and extending rearwardly therefrom toward rear wall 60 into a respective gap 126 formed between front and rear walls 58, 60. Each finger 124 also includes a second portion that is perpendicular to the first portion and extends into interior region 62 toward drive post 76. The second portion of each flexible finger 124 includes a front ramp edge 128 and a rear ramp edge 130 as shown, for example, in FIG. 7.

Cylindrical interior wall 38 of outer shell 22 is formed to include a pair of axially-extending snap ribs 132 as shown, for example, in FIG. 5. Each snap rib 132 includes a front inclined edge 134 and rear inclined edge 136. As removal hub 28 is moved along shift path 110 from the locking position to the unlocking position in response to actuation of throw member 112 by rotation of key 36 in direction 52, flexible fingers 124 move from a first position, shown in FIGS. 5 and 8, in which front ramp edge 128 of each finger 124 engages rear inclined edge 136 of the companion snap rib 132, to a second position, shown in FIG. 7, in which rear ramp edge 130 of each finger 124 faces toward front inclined edge 134 of the companion snap rib 132.

Figure 8:
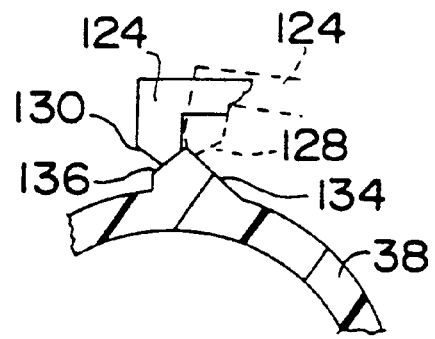
FIG. 8 is an enlarged sectional view of a portion of the cylindrical interior wall of the outer shell and a flexible finger of the removal hub showing the cylindrical interior wall including a snap rib and the flexible finger moving from a first position (in solid) in which the flexible finger engages a rear inclined edge of the rib to a second position (in phantom) in which the flexible finger engages a front inclined edge of the rib.
Figure 13:
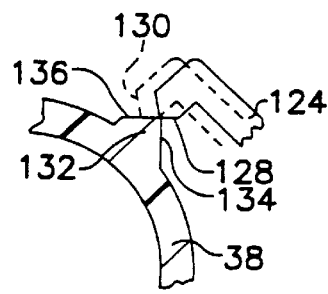

Fingers 124 are resiliently deflected outwardly away from one another as a result of each front ramp edge 128 camming against the companion rear inclined edge 136 during initial forward movement of removal hub 28 from the locking position toward the unlocking position. Each finger 124 is at its maximum deflection when the apex formed at the junction of front and rear ramp edges 128, 130 of the respective finger 124 engages the apex formed at the junction of the companion front and rear inclined edges 134, 136 of the respective snap rib 132, as shown, for example, in FIG. 13. Fingers 124 resiliently deflect inwardly toward one another and each rear ramp edge 130 cams against the companion front inclined edge 134 during further forward movement of removal hub 28 from the locking position toward the unlocking position as shown in FIG. 8 (in phantom). Thus, each flexible finger 124 snaps over the companion snap rib 132 as removal hub 28 is driven from the locking position to the unlocking position by throw member 112.

When removal hub 28 is in the unlocking position, fingers 124 cooperate with snap ribs 132 to prevent removal hub 28 from inadvertently shifting back into the locking position. Thus, after key 36 has been turned in direction 52 to the second position, shown in FIG. 3, having throw member 112 in a position engaging drive surface 118 of drive post 76 as shown in FIG. 7, key 36 can be turned back to the first position, shown in FIG. 2, which moves throw member 112 into a disengaged position shown in FIG. 7 (in phantom), and removal hub 28 will remain in the unlocking position. Movement of removal hub 28 back into the locking position is discussed below with reference to FIGS. 11–14.

Lock cylinder 34 includes a circumferential retainer groove 138, shown in FIG. 1, and outer shell 22 includes a pair of arcuate retaining teeth 140, shown in FIG. 9, appended to cylindrical interior wall 38 and extending into retainer groove 138 to retain lock cylinder 34 in bore 40 of interior wall 38. Lock cylinder 34 also includes a positioning lug 142. Cylindrical interior wall 38 is formed to include an arcuate groove 144, shown in FIG. 3 (in phantom), that receives positioning lug 142.

Positioning lug 142 slides relative to outer shell 22 within groove 144 as lock cylinder 34 is rotated between the first position, shown in FIG. 2, and the second position, shown in FIG. 3. Ends of groove 144 are defined by first and second stop surfaces 146, 148 as shown in FIG. 3. Engagement of lug 142 with first and second stop surfaces 146, 148 limits the amount by which lock cylinder 34 can rotate relative to outer shell 22. Groove 144 and lug 142 are formed so that lock cylinder 34 can rotate through an angle of ninety degrees (90°) when moved between the first and second positions.

A plurality of locking plates 150 are spring-biased out of associated slots 152 formed in lock cylinder 34 and cylindrical interior wall 34 is formed to include an axially-extending channel 154 that receives plates 150 when lock cylinder 34 is in the first position. Insertion of key 36 into lock cylinder 34 retracts locking plates 150 into lock cylinder 34, thereby moving locking plates 150 out of channel 154. When locking plates 150 are retracted, lock cylinder 34 is unlocked from outer shell 22 and can rotate relative to cylindrical interior wall 38 in response to rotation of key 36.

When lock cylinder 34 is rotated out of the first position, key 36 cannot be removed from lock cylinder 34 so that locking plates 150 remain retracted into lock cylinder 34. Key 36 can only be removed from lock cylinder 34 when lock cylinder 34 is in the first position having locking plates 150 aligned with channel 154. When key 36 is removed from lock cylinder 34, locking plates 150 are spring-biased into channel 154. Receipt of locking plates 150 in channel 154 automatically locks lock cylinder 34, thereby preventing lock cylinder 34 from rotating relative to outer shell 22.

After fuel cap 20 is unlocked and removed from filler neck 44, the vehicle associated with filler neck 44 can be refueled through filler neck 44 in a conventional manner. After the vehicle is refueled, fuel cap 20 can be installed back into filler neck 44. As previously described, outer shell 22 is drivingly coupled to installation hub 24, installation hub 24 is drivingly coupled to torque-override ring 26, and torque-override ring 26 is drivingly coupled to closure member 30 so that rotation of outer shell 22 in cap-installing direction 56 allows fuel cap 20 to be installed in filler neck 44.

Outer shell 22 includes a circular top plate 156 and a cylindrical outer wall 158 that extends downwardly from a perimeter 160 of top plate 156 as shown in FIG. 1.

Operating handle 50 extends upwardly from top plate 156. Operating handle 50 includes a flat top portion 162 at the center of outer shell 22 and opposing angled side portions 164 that slope from top portion 162 down to perimeter 160 of top plate 156. Side portions 164 of operating handle 50 are each formed to include a cavity 166.

Cylindrical interior wall 38 of outer shell 22 extends downwardly from top portion 162 of operating handle 50 past top plate 156 as shown in FIGS. 1 and 9. Outer shell 22 is formed so that a bottom edge 163 of cylindrical interior wall 38 is spaced apart from top plate 156 by an amount that is approximately the same as the amount by which a bottom edge 165 of cylindrical outer wall 158 is spaced apart from top plate 156.

Cylindrical outer wall 158 of outer shell 22 is formed to include a plurality of circumferentially-spaced inwardly-directed teeth 168 as shown, for example, in FIGS. 1 and 4. Annular flange 92 of closure member 30 has an outer perimetral lip 170. Annular flange 92 is appropriately sized to allow closure member 30 to mate with outer shell 22 so that perimetral lip 170 is closely adjacent to cylindrical outer wall 158 as shown in FIG. 4.

Retainer ring 32 includes a perimetral skirt 172 that engages teeth 168 to retain retainer ring 32 inside outer shell 22. Outer shell 22 is formed to include a plurality of generally rectangular piloting webs 174 at the corner formed by outer wall 158 and top plate 156 and perimetral lip 170 is positioned to lie between piloting webs 174 and retainer ring 32. Thus, perimetral lip 170 of annular flange 92 is trapped between piloting webs 174 and retainer ring 32, thereby preventing separation of closure member 30 from outer shell 22.

Piloting webs 174 ensure that annular flange 92 is axially spaced apart from top plate 156 of outer shell 22 by a sufficient distance to allow torque-override ring 26 to be sandwiched between annular flange 92 and top plate 156 as shown in FIGS. 4, 6, and 9. Torque-override ring 26 includes an annular disk portion 176 which is formed to include a large aperture 178 as shown in FIG. 1. Torque-override ring 26 also includes a plurality of radial drive teeth 180 extending radially away from disk portion 176 into aperture 178 and a plurality of axial drive teeth 182 extending axially away from disk portion 176 toward annular flange 92 of closure member 30.

Annular flange 92 of closure member 30 is formed to include a plurality of generally rectangular apertures 184 as shown in FIG. 1. A flexible finger 186 extends into each of apertures 184 and an upwardly-extending drive tooth 188 is appended to the end of each finger 186. Torque-override ring 26 rests upon annular flange 92 of closure member 30 so that axial drive teeth 182 of torque-override ring 26 interact with drive teeth 188. Piloting webs 174 and top plate 156 of outer shell 22 cooperate to orient torque-override ring 26 at the proper position relative to closure member 30 to maintain engagement between axial drive teeth 182 and drive teeth 188.

Installation hub 24 is also sandwiched between annular flange 92 of closure member 30 and outer shell 22. Installation hub 24 includes a ring 190, a pair of driven portions 192 extending upwardly from ring 190, and a pair of curved flexible arms 194 attached to and extending alongside ring 190 as shown in FIG. 1. A drive tooth 196 is appended to the end of each flexible arm 194.

Figure 10:
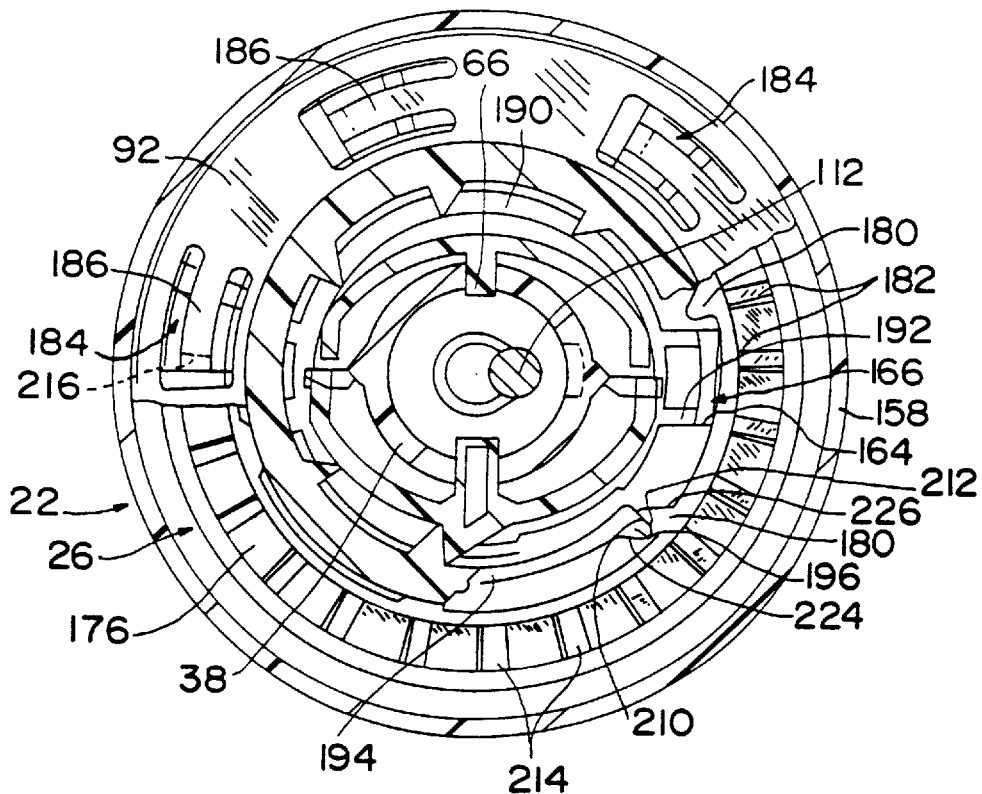
FIG. 10 is a sectional view taken along line 10—10 of FIG. 9, with portions broken away, showing the driving connections between the outer shell, the installation hub, the torque-override ring, and the closure member that allow the fuel cap to be inserted into the filler neck, and showing the driving connections between the outer shell, the removal hub, and the closure member that allow the fuel cap to be removed from the filler neck.

Each of driven portions 192 are received by respective cavities 166 formed in operating handle 50 so that angled side portions 164 engage driven portions 192 as shown in FIGS. 9 and 10. Engagement of side portions 164 of operating handle 50 with driven portions 192 of installation hub 24 establishes the driving connection between outer shell 22 and installation hub 24. Thus, installation hub 24 rotates along with outer shell 22 when outer shell 22 is rotated in either cap-removal direction 54 or cap-installing direction 56.

Ring 190 and flexible arms 194 of installation hub 24 are positioned to lie between annular flange 92 of closure member 30 and top plate 156 of outer shell 22 as shown, for example, in FIG. 4, so that the amount by which installation hub 24 can axially move is limited. In addition, outer shell 22 is formed to include a pair of downwardly-extending arcuate locating ribs 198, shown best in FIG. 1, that are received by an aperture 200 formed in ring 190 of installation hub 24 so that the amount by which installation hub 24 can radially move is limited. Closure member 30 and outer shell 22 cooperate to position installation hub 24 within aperture 178 formed in disk portion 176 of torque-override ring 26 so that drive teeth 196 appended to flexible arms 194 of installation hub 24 can interact with radial drive teeth 180 of torque-override ring 26.

When outer shell 22 is rotated in cap-installing direction 56, installation hub 24 rotates along with outer shell 22 due to the driving connection between angled side porions 164 of operating handle 50 and driven portions 192 of installation hub 24. Rotation of installation hub 24 in cap-installing direction 56 causes a drive surface 210 of each drive tooth 196 appended to each respective flexible arm 194 to drivingly engage a drive surface 212 of two of radial drive teeth 180 appended to torque-override ring 26 as shown in FIG. 10. Engagement of drive surfaces 210 with respective drive surfaces 212 causes torque-override ring 26 to rotate in cap-installing direction 56 along with installation hub 24 and outer shell 22.

Rotation of torque-override ring 26 in cap-installing direction 56 during installation of fuel cap 20 in filler neck 44, causes a ramp surface 214 of selected axial drive teeth 182 appended to disk portion 176 of torque-override ring 26 to engage a corresponding ramp surface 216 of drive teeth 188 appended to closure member 30 so that closure member 30 also rotates in cap-installing direction 56 along with installation hub 24, outer shell 22, and torque-override ring 26. Flexible arms 194 have sufficient stiffness to sustain the driving connection between teeth 182 appended to torque-override ring 26 and teeth 188 appended to closure member 30 until O-ring 46 seats against lip 48 of filler neck 44. Closure member 30 stops rotating in cap-installing direction 56 once O-ring 46 is adequately seated against lip 48 of filler neck 44.

Continued rotation of outer shell 22 in cap-installing direction 56 after O-ring 46 is adequately seated against lip 48 of filler neck 44, results in continued rotation of installation hub 24 and torque-override ring 26 in cap-installing direction 56. However, closure member 30 will be constrained from rotating in cap-installing direction 56 due to seating of O-ring 48 against lip 48 of filler neck 44 and ramp surfaces 214 of axial drive teeth will cam against ramp surfaces 216 of drive teeth 188, thereby deflecting flexible fingers 186 away from torque-override ring 26 so that teeth 180 can move past teeth 188. Thus, flexible fingers 186 ratchet within apertures 184 relative to torque-override ring 26 to provide the torque override connection between outer shell 22 and closure member 30.

As previously described, fuel cap 20 remains unlocked while outer shell 22 and closure member 30 are rotated in cap-installing direction 56 during installation of fuel cap 20 back into filler neck 44. As also previously described, fuel cap 20 automatically locks when outer shell 22 is rotated by a slight amount in cap-installing direction 56 relative to closure member 30 after O-ring 46 seats against lip 48 of filler neck 44.

When outer shell 22, installation hub 24, and torque-override ring 26 are rotated in cap-installing direction 56 after O-ring 46 is seated against lip 48 of filler neck 44, removal hub 28 also rotates in cap-installing direction 56 due to the driving connection between cylindrical outer wall 38 of outer shell 22 and first and second guide lugs 66, 72 of removal hub 28. Rotation of removal hub 28 in cap-installing direction 56, causes a ramp surface 218 of drive lug 74 to engage a ramp surface 220 of one of axially-extending drive teeth 86 as shown in FIG. 11.

Figure 12:
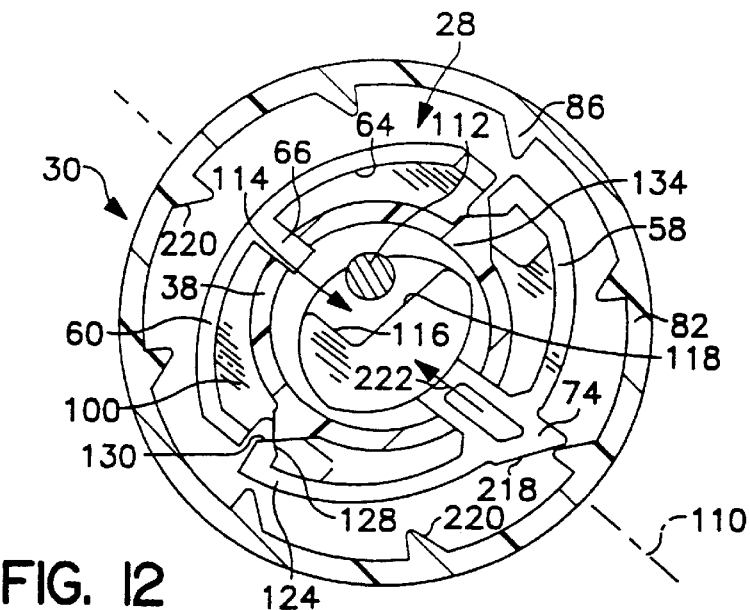
Figure 14:
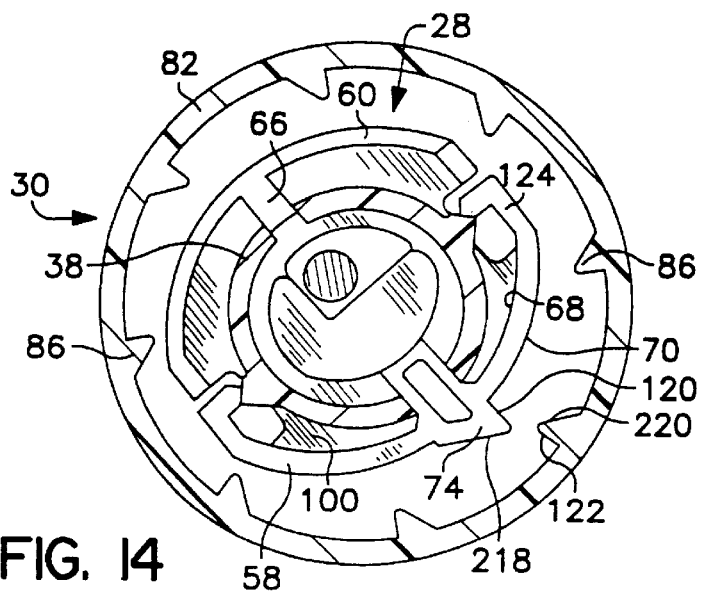

Continued rotation of outer shell 22 in cap-installing direction 56 after ramp surface 218 engages one of ramp surfaces 220, results in movement of removal hub 28 relative to cylindrical interior wall 38 of outer shell 22 along shift path 110 in a direction indicated by arrow 222 shown in FIG. 12. Further rotation of outer shell 22 in cap-installing direction 56 after ramp surface 218 engages one of ramp surfaces 220, results in removal 28 being returned to the locking position as shown in FIG. 14. Thus, rotation of outer shell 22 in cap-removal direction 56 relative to closure member 30 automatically locks fuel cap 20 due to movement of removal hub 28 into the locking position in response to camming engagement between ramp surface 218 of drive lug 74 and ramp surface 220 of one of drive teeth 86.

Figure 11:
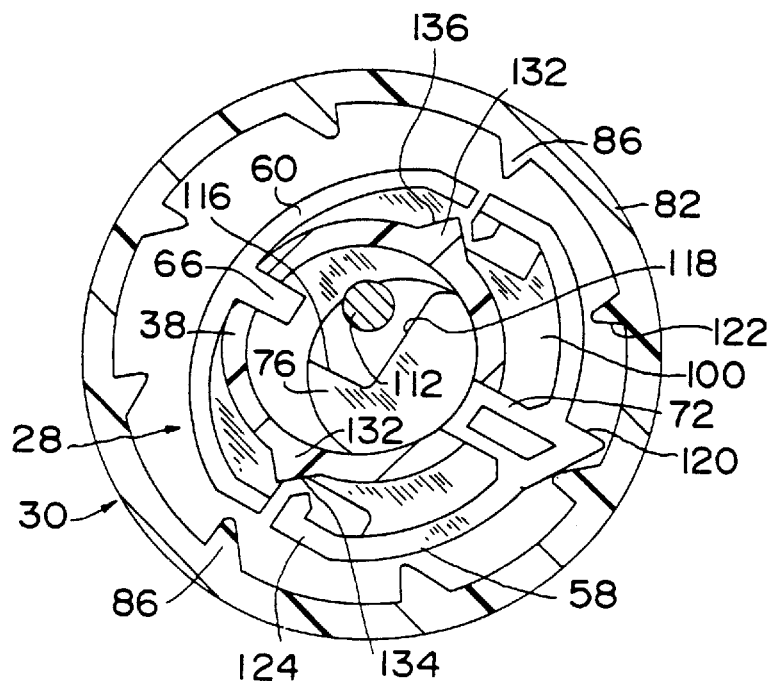
FIGS. 11–14 show a sequence wherein the removal hub is automatically reset to lock the fuel cap when the fuel cap is fully inserted into the filler neck and the outer shell is further rotated in a clockwise cap-insertion direction to further rotate the removal hub in the clockwise cap-insertion direction.

As removal hub 28 moves along shift path 110 toward the locking position in response to camming engagement between ramp surface 218 and ramp surface 220, flexible fingers 124 deflect from the position shown in FIG. 11, in which rear ramp edge 130 of each finger 124 faces toward front inclined edge 134 of the companion snap rib 132, through the position shown in FIG. 12, in which fingers 124 are at their maximum deflection orientations, and then into the position shown in FIG. 14, in which front ramp edge 128 of each finger 124 engages rear inclined edge 136 of the companion snap rib 132. Thus, each flexible finger 124 snaps over the companion snap rib 132 as removal hub 28 is driven back into the locking position.

If lock cylinder 34 is at the second position having throw member 112 engaging drive surface 118 of drive post 76, when removal hub 28 is moved from the position shown in FIG. 11 to the position shown in FIG. 14, drive surface 118 will engage throw member 112 to automatically rotate lock cylinder 34 relative to outer shell 22 from the second position, shown in FIG. 3, back to the first position, shown in FIG. 2. In addition, during automatic movement of lock cylinder 34 from the second position back to the first position, key 36 will rotate along with lock cylinder 34.

When removal hub 28 is in the locking position, fingers 124 cooperate with snap ribs 132 to prevent removal hub 28 from inadvertently shifting into the unlocking position. Thus, removal hub 28 will remain in the locking position until key 36 is, once again, inserted into lock cylinder and turned in direction 52 to unlock fuel cap 20.

If outer shell 22 is rotated in cap-removal direction 54 when removal hub 28 is in the locking position having drive lug 74 disengaged from closure member 30, removal hub 28 will rotate within interior region 84 of closure member 30 in cap-removal direction 54 without any resulting rotation of closure member 30 in cap-removal direction 54. As removal hub 28 rotates within interior region 84 of closure member 30 in cap-removal direction 54 relative to closure member 30, installation hub 24 also rotates in cap-removal direction 54 due to the driving connection between driven portions 192 and angled side portions 164 of operating handle 50.

Rotation of installation hub 24 in cap-removal direction 54 causes a ramp surface 224 of each drive tooth 196 to engage a ramp surface 226 of respective radial drive teeth 180. The rotational torque imparted on closure member 30 by installation hub 24 through torque-override ring 26 as a result of the engagement of ramp surface 224 with ramp surface 226 is insufficient to cause closure member 30 to rotate in cap-removal direction 54 relative to filler neck 44. Thus, engagement of ramp surfaces 224 of teeth 196 with ramp surfaces 226 of teeth 180 as installation hub 24 is rotated in cap-removal direction 54 results in flexible arms 194 bending inwardly toward ring 190 of installation hub 24 so that teeth 196 can move past teeth 180 rather than resulting in rotation of closure member 30 relative to filler neck 44.

Although the invention has been described in detail with reference to a certain preferred embodiment, variations and modifications exist within the scope and spirit of the invention as described and defined in the following claims.

What is claimed is:

1. A lockable fuel cap for mounting in an open end of a vehicle filler neck, the fuel cap comprising
   a closure member adapted to mate with the open end of the vehicle filler neck, the closure member being formed to include an interior region and having a drive tooth positioned to lie in the interior region,
   a removal hub positioned to lie in the interior region of the closure member and being formed to include a drive lug, the removal hub being movable between a locking position in which the drive lug is spaced apart from the drive tooth and a releasing position in which the drive lug engages the drive tooth, and
   an outer shell including an interior wall defining a guide slot receiving the drive lug and guiding the movement of the removal hub between the locking and releasing positions, the outer shell being rotatable relative to the closure member and drivingly coupled to the removal hub so that the closure member remains generally stationary upon rotation of the outer shell in a cap-removal direction when the drive lug is in the locking position and the closure member rotates in the cap-removal direction upon rotation of the outer shell in the cap-removal direction when the drive lug is in the releasing position.

2. The fuel cap of claim 1, wherein the removal hub includes an arcuate front wall and an arcuate rear wall spaced apart from the arcuate front wall to define an inner region therebetween and the drive lug is coupled to the front wall.

3. The fuel cap of claim 2, further comprising a lock cylinder rotatable relative to the outer shell, the lock cylinder including a throw member positioned to lie within the inner region of the removal hub.

4. The fuel cap of claim 3, wherein the removal hub includes a drive post and the throw member selectively engages the drive post during rotation of the lock cylinder in the cap-removal direction to move the removal hub from the locking position to the releasing position.

5. The fuel cap of claim 4, wherein the removal hub includes a pair of fingers appended to one of the arcuate front and rear walls, the interior wall of the outer shell is formed to include a pair of ribs, and each finger moves across a respective rib during movement of the removal hub between the locking position and the releasing position.

6. The fuel cap of claim 5, wherein the fingers are flexible and deflect away from the interior wall of the outer shell upon movement of the fingers across the respective rib.

7. The fuel cap of claim 2, wherein the interior wall is formed to include a second guide slot, the drive lug includes a first guide lug received by the guide slot for sliding movement relative to the interior wall and the removal hub includes a second guide lug received by the second slot for sliding movement relative to the interior wall.

8. The fuel cap of claim 7, further comprising a lock cylinder rotatable relative to the outer shell, the lock cylinder including a throw member positioned to lie within the inner region of the removal hub.

9. The fuel cap of claim 8, wherein the removal hub includes a drive post positioned to lie between the first and second guide lugs and the throw member selectively engages the drive post during rotation of the lock cylinder to move the removal hub from the locking position to the releasing position.

10. The fuel cap of claim 1, wherein the outer shell includes a top plate positioned to lie outside the interior region of the closure member and an outer wall appended to the top plate and extending over the closure member.

11. The fuel cap of claim 10, wherein the outer wall includes a first bottom edge spaced a first distance from the top plate and the interior wall includes a second bottom edge spaced a second distance from the top plate and the first distance is substantially equal to the second distance.

12. The fuel cap of claim 1, wherein the interior wall of the outer shell is formed to include an axial rib and the removal hub is formed to include a finger that deflects to snap over the rib as the removal hub moves between the locking and releasing positions.

13. The fuel cap of claim 12, wherein the interior wall is formed to include a second guide slot, the drive lug includes a first guide lug received by the guide slot for sliding movement relative to the interior wall and the removal hub includes a second guide lug received by the second slot for sliding movement relative to the interior wall.

14. The fuel cap of claim 13, wherein the finger is positioned to lie between the first and second guide lugs.

15. The fuel cap of claim 1, further comprising an installation hub drivingly coupled to outer shell to transmit rotation of the outer shell in a cap-installation direction to closure.

16. The fuel cap of claim 15, wherein the outer shell includes a top plate positioned to lie outside the interior region of the closure member and a handle extending from the top plate and the handle engages the driven portion of the installation hub.

17. The fuel cap of claim 15, wherein the installation hub includes a ring and a driven portion extending upwardly from the ring.

18. The fuel cap of claim 17, wherein the fuel cap further includes a torque-override ring drivingly coupled to both the installation hub and the closure member such that rotation of the outer shell in the cap-installation direction is transmitted to the closure through the installation hub and torque-override ring.

19. The fuel cap of claim 17, further comprising a torque-override ring drivingly coupled to the installation hub and the closure member to transfer rotational movement of the outer shell from the installation hub to the closure member in the cap-installation direction.

20. The fuel cap of claim 19, wherein the torque-override ring forms radial drive teeth and axial drive teeth, the installation hub includes flexible arms, and the closure member includes upwardly extending teeth so that the radial drive teeth of the torque-override ring engage the flexible arms and the axial drive teeth engage the upwardly extending teeth of the closure member during rotation of the outer shell in the cap-installation direction.

21. The fuel cap of claim 20, wherein the teeth of the closure member, the radial and axial drive teeth of the torque-override ring, and the flexible fingers include cammed surfaces.

22. The fuel cap of claim 20, wherein the drive tooth of the closure member is formed to include a first drive edge and a first ramp edge, the drive lug of the removal hub includes a second drive edge and a second ramp edge, the first drive edge engages the second drive edge when the outer shell is rotated in the cap-removal direction, and the first ramp edge engages the second ramp edge to move the removal hub from the releasing position to the locking position during movement of the outer shell in a cap-removal direction after the closure member is seated against the filler neck.

23. The fuel cap of claim 15, wherein the installation hub includes a ring with flexible fingers extending from the ring, the closure member includes an outer lip and teeth extending upward from the outer lip, the torque-override ring includes radial drive teeth and axial drive teeth such that the radial drive teeth engage the flexible fingers and the axial drive teeth engage the teeth of the closure member during rotation of the outer shell in the cap-installation direction.

24. A lockable fuel cap for mounting in an open end of a vehicle filler neck, the fuel cap comprising
a closure member adapted to mate with the open end of the vehicle filler neck, the closure member being formed to include an interior region and having a drive tooth positioned to lie in the interior region,
an outer shell being rotatable relative to the closure member, the outer shell including an interior wall being positioned to extend into the interior region of the closure member,
a removal hub drivingly coupled to the interior wall of the closure member, the removal hub including a drive lug and being formed for movement between a locking position in which the drive lug is spaced apart from the drive tooth of the closure member so that the closure member remains generally stationary when the outer shell is rotated in a cap-removal direction and a releasing position in which the drive lug engages the drive tooth so that rotation of the outer shell in the cap-removal direction rotates the removal hub and the closure member in the cap-removal direction, and
a lock core coupled to the outer shell, the lock core being rotatable relative to the outer shell and including a throw member positioned to lie in the interior region of the closure member, rotation of the lock core moving the throw member into engagement with the removal hub to move the removal hub from the locking position to the releasing position.

25. The fuel cap of claim 24, wherein the interior wall is formed to include a slot and the removal hub is formed to include a guide lug such that the guide lug is received in the slot to guide the movement of the removal hub between locking and releasing positions.

26. The fuel cap of claim 25, wherein the interior wall is further formed to include a pair of ribs and the removal hub is formed to include a pair of fingers that snap over the ribs as the removal hub moves between locking and releasing positions.

27. The fuel cap of claim 26, wherein the interior wall is cylindrical, the slot is formed so that the removal hub is movable relative to the interior wall along a first diameter of the interior wall, and the pair of ribs of the interior wall are positioned to lie along a second diameter of the interior wall that is generally orthogonal to the first diameter.

28. The fuel cap of claim 24, wherein the removal hub is formed to include a front arcuate wall, a rear arcuate wall, and an inner space defined between front and rear arcuate walls, the interior wall of the outer shell includes a portion that is positioned to lie in the inner space, and the throw member is positioned to lie in the inner space.

29. The fuel cap of claim 28, wherein the interior wall is formed to include an edge defining a slot and the removal hub includes a surface that slides relative to the edge during movement of the removal hub between locking and releasing positions.

30. The fuel cap of claim 29, wherein the removal hub includes a drive post selectively engaged by the throw member to move the removal hub from the locking position to the releasing position and a guide lug extending between the drive lug and the drive post, the guide lug provides the surface that slides relative to the edge, and the edge is positioned to lie between the drive lug and the drive post.

31. The fuel cap of claim 24, wherein the removal hub is formed to include a drive post, the drive post is formed to include a cut-out bounded by a drive surface, the throw member is positioned to lie in the cut-out, and the throw member engages the drive surface as the lock core is rotated to move the removal hub from the locking position to the releasing position.

32. The fuel cap of claim 31, wherein the interior wall is formed to include a bore and a portion of the drive post is positioned to lie in the bore.

33. The fuel cap of claim 24, wherein the drive tooth of the closure member is formed to include a first drive edge and a first ramp edge, the drive lug of the removal hub includes a second drive edge and a second ramp edge, the first drive edge engages the second drive edge when the outer shell is rotated in the cap-removal direction, the first ramp edge engages the second ramp edge to move the removal hub from the releasing position to the locking position during movement of the outer shell in a cap-removal direction after the closure member is seated against the filler neck.

34. The fuel cap of claim 24, wherein the interior wall is formed to include first and second slots, the removal hub includes a first guide lug received by the first slot and a second guide lug received by the second slot, and the removal hub is further formed to include a drive post that is positioned to lie between the first and second guide lugs.

35. The fuel cap of claim 34, wherein the removal hub includes a pair of fingers positioned to lie on opposite side of the drive post in spaced apart relation therewith, the interior wall includes a pair of ribs, and the fingers engage the ribs and snap over the ribs during movement of the removal hub between locking and releasing positions.

36. A lockable fuel cap for mounting in an open end of a vehicle filler neck, the fuel cap comprising
a closure member adapted to mate with the open end of the vehicle filler neck, the closure member being formed to include an interior region and having a drive tooth positioned to lie in the interior region, a removal hub positioned to lie in the interior region of the closure member and being formed to include a drive lug and a drive post, the removal hub being movable between a locking position in which the drive lug is spaced apart from the drive tooth and a releasing position in which the drive lug engages the drive tooth, an outer shell including an interior wall being configured to guide the movement of the removal hub between the locking and releasing positions, the outer shell being rotatable relative to the closure member and drivingly coupled to the removal hub so that the closure member remains stationary upon rotation of the outer shell in cap-removal direction when the drive lug is in the locking position and the closure member rotates in the cap-removal direction upon rotation of the outer shell in the cap-removal direction when the drive lug is in the releasing position, a lock cylinder rotatable relative to the outer shell, the lock cylinder including a throw member being positioned to engage the drive-post of the removal hub during rotation of the lock cylinder to move the removal hub from the locking position to the releasing position, and an installation hub drivingly coupled to the outer shell to transmit rotation of the outer shell in a cap-installation direction to the closure so that rotation of the outer shell in the cap-installing direction allows the fuel cap to be installed in the filler neck.

37. The fuel cap of claim 36, wherein the removal hub includes arcuate front and rear walls defining an inner region therebetween, and also wherein the drive post lies within the inner region and the drive lug is formed to extend away from the front wall.

38. The fuel cap of claim 37, wherein the interior wall of the outer shell includes a pair of ribs and the removal hub includes a pair of fingers appended to one of the arcuate front and rear walls such that each finger moves across a respective rib during movement of the removal hub between locking and releasing positions.

39. The fuel cap of claim 38, wherein the fingers are flexible and deflect away from the interior wall of the outer shell upon movement of the fingers across each respective rib.

40. The fuel cap of claim 36, wherein the interior wall includes a guide slot and the removal hub includes a guide lug received within the guide slot for sliding movement relative to the interior wall.

41. The fuel cap of claim 40, wherein the interior wall is further formed to include a bore and a portion of the drive post is positioned to lie in the bore.

42. The fuel cap of claim 40, wherein the interior wall includes a second guide slot and the removal hub includes a second guide lug extending into the inner region and being received by the interior wall for sliding movement relative to the interior wall as the removal hub is moved between locking and releasing positions.

43. The fuel cap of claim 42, wherein the drive post of the removal hub is positioned to lie between the first and second guide lugs.

44. The fuel cap of claim 36, wherein the outer shell includes a top plate positioned to lie outside the interior region of the closure member and an outer wall appended to the to the top plate and extending over the closure member.

45. The fuel cap of claim 44, wherein the outer wall includes a first bottom edge spaced a first distance from the top plate and the interior wall includes a second bottom edge spaced a second distance from the top plate and the first distance is substantially equal to the second distance.

46. The fuel cap of claim 36, wherein the fuel cap further includes an installation hub comprising a ring and a driven portion extending upwardly from the ring, the outer shell including a cavity such that the driven portion is received within the cavity.

47. The fuel cap of claim 46, wherein the fuel cap further includes a torque-override ring drivingly coupled to the installation hub and closure member such that rotational movement of the outer shell in a cap-installation direction is transferred from the outer shell to the installation hub, to the torque-override ring, and finally to the closure member.

* * * * *